United States Patent
Pagonis et al.

(10) Patent No.: US 11,956,706 B2
(45) Date of Patent: Apr. 9, 2024

(54) COMPUTER-IMPLEMENTED METHOD OF PROCESSING AN EMERGENCY CALL AND EMERGENCY COMMUNICATION NETWORK

(71) Applicant: ATOS Public Safety, LLC, Irving, TX (US)

(72) Inventors: Athanasios Pagonis, Vrilissia (GR); Zisis Tsiatsikas, Salonika (GR); Marietta Mikrouli, Attiki (GR); Sofia Anagnostou, Athens (GR)

(73) Assignee: ATOS PUBLIC SAFETY LLC, Irving, TX (US)

( * ) Notice: Subject to any disclaimer, the term of this patent is extended or adjusted under 35 U.S.C. 154(b) by 228 days.

(21) Appl. No.: 17/536,208

(22) Filed: Nov. 29, 2021

(65) Prior Publication Data

US 2022/0174465 A1 Jun. 2, 2022

(30) Foreign Application Priority Data

Nov. 30, 2020 (EP) .................................. 20 210 704

(51) Int. Cl.
*H04W 4/90* (2018.01)
*H04W 4/029* (2018.01)
(Continued)

(52) U.S. Cl.
CPC ............. *H04W 4/90* (2018.02); *H04W 4/029* (2018.02); *H04W 4/14* (2013.01); *H04W 80/10* (2013.01)

(58) Field of Classification Search
CPC ......... H04W 4/90; H04W 4/029; H04W 4/14; H04W 80/10; H04W 4/023; H04W 4/16;
(Continued)

(56) References Cited

U.S. PATENT DOCUMENTS

2008/0310599 A1 12/2008 Purnadi et al.
2016/0065748 A1* 3/2016 Li ..................... H04M 3/42263
379/45

(Continued)

OTHER PUBLICATIONS

European Search Report for European Patent Application No. 20210704.1 dated May 14, 2021.

*Primary Examiner* — Marcos L Torres
(74) *Attorney, Agent, or Firm* — MEAGHER EMANUEL LAKS IGOLDBERG & LIAO, LLP

(57) ABSTRACT

A computer-implemented method of processing an emergency call reported to a Public Safety Answering Point (PSAP) by a user of a first communication device can include an Emergency Service Routing Proxy (ESRP) performing a search operation to track location data of the first communication device in response to receiving an emergency callback request from the PSAP that has received an emergency call from a first communication device. The callback request can be forwarded to a most appropriate gateway of a carrier according to the first communication device's location data. An SIP INVITE request comprising a new header including a request for forking SMS for initiating, at the carrier a procedure for retrieving mobile network addresses of communication devices that are co-located to the first communication device can be sent in response to the callback request not being answered by the first communication device.

19 Claims, 4 Drawing Sheets

(51) Int. Cl.
*H04W 4/14* (2009.01)
*H04W 80/10* (2009.01)

(58) Field of Classification Search
CPC ..... H04M 2203/2094; H04M 3/42195; H04M 3/5116; H04L 65/1033; H04L 65/1045; H04L 65/1069; H04L 65/1104; H04L 65/403
See application file for complete search history.

(56) References Cited

U.S. PATENT DOCUMENTS

2017/0099579 A1* 4/2017 Ryan .................... H04M 3/5116
2019/0132903 A1* 5/2019 Suxena .................. H04W 4/14

\* cited by examiner

COMPUTER-IMPLEMENTED METHOD OF PROCESSING AN EMERGENCY CALL AND EMERGENCY COMMUNICATION NETWORK

CROSS-REFERENCE TO RELATED APPLICATION

The present application claims priority to European Patent Application No. EP 20 210 704.1, which was filed on Nov. 30, 2020. The entirety of this European Patent Application is incorporated by reference herein.

FIELD

The present invention relates to a computer-implemented method of processing an emergency call and a corresponding emergency communication system, communication network, and telecommunication apparatus.

BACKGROUND

The Next Generation 9-1-1 (NG9-1-1) project aims at constantly improving public emergency communications services specifically for users of mobile devices. One of its features is the emergency callback function or mode that enables an operator, e.g., at a Public Safety Answering Point (PSAP), upon receiving an emergency call, to callback for obtaining further information on the emergency incident, e.g. location data or the like. Moreover, in emergency callback mode, some functions of the mobile phone will be disabled, for example, in emergency callback mode, it is not possible to send and receive messages, or browse web pages on the phone that initiated the emergency call. As mentioned above, e.g., as the location of the person calling may need to be verified, it is mandatory to be able to perform callbacks in NG9-1-1 so as to ensure the overall concept of public safety.

SUMMARY

We determined that a common problem with respect to emergency callbacks lies in failures during the process of call establishment between the call-taker and the emergency caller. Taking into account that the majority of the emergency callers use cellular phones, there is a high possibility that the emergency callback might fail either because of a multivariant urban environment with Loss-of-Signal (LoS) points which trap an emergency caller (i.e., reduce the signal strength), or even due to fading channels. Embodiments of the present invention can be configured and/or implemented to provide a method of processing an emergency call and a corresponding emergency communication network for overcoming the above mentioned problem of not being able to callback due to failures or the like upon receipt of an emergency call.

A computer-implemented method of processing an emergency call reported to a Public Safety Answering Point (PSAP) can include the steps of:
  receiving, at an Emergency Service Routing Proxy (ESRP) an emergency callback request from the PSAP that has received an emergency call from a first communication device;
  performing, by the ESRP, a search operation to track location data of the first communication device;
  forwarding the callback request to a most appropriate gateway (GW) of the carrier according to the first communication devices' location data, and upon detecting that the user of the first communication device does not respond to the callback request within a predetermined time interval, and
  initiating a SIP INVITE request to the carrier, the SIP INVITE request comprising a new header, the new header comprising a request for forking short message service (SMS), for initiating, at the carrier, a procedure for retrieving mobile network addresses of communication devices that are co-located to the first communication device for sending a respective emergency SMS to every co-located communication device.

It should be appreciated that the SMS can include texting or text-only messages. The text messaging can be short text messages sent between telecommunication devices (e.g. smart phones, a smart phone and a laptop computer or desktop computer, etc.).

A very efficient approach of processing an emergency incident can be provided that can account for a situation where a callback request to the emergency caller is not answered or is not possible. Unsuccessful callback requests to emergency callers can be solved by contacting the emergency caller's neighbors for providing information or data of interest, as geolocation data or any other useful information for handling the emergency to the call taker at the PSAP. Embodiments can implement crowdsourcing of individuals based on specified data and algorithms so as to gather more information on an abandoned or disconnected emergency call concerning an emergency incident that has been transmitted to, for example, a first responder or dispatcher at a PSAP. Persons that are located in the vicinity of the emergency caller that does not answer a callback request can be contacted according to a pre-selected procedure or predetermined procedure, and thus may assist the first responder or dispatcher in handling the emergency incident by providing information or data of interest.

In some embodiments, an emergency SMS can comprise a request for providing location data of the respective communication device and/or a request for providing assistance with respect to the emergency incident that was reported by the user of the first communication device and/or a request for providing data of interest (Datax1, Datax2, DataxN) related to the emergency incident to the PSAP. In some embodiments, when the request for forking SMS is created, a new conference bridge can be created. Embodiments of the method can also include the step of connecting a call taker at the PSAP to the new conference bridge.

A new header of an SIP INVITE request can be utilized in embodiments. The new header of the SIP INVITE request can be configured as CustomEmergencyHeader: Fork SMS, Datax1, Datax2, DataxN, for example.

Embodiments can also include waiting a predetermined time period for receiving SMS responses to the emergency SMS. After the predetermined time period has elapsed and a number of SMS responses comprising consent for providing location data have been received, the method can also include creating a sorted list comprising the location data of the telecommunication devices in the vicinity of the first telecommunication device. Telecommunication devices that have not provided consent for providing location data but have provided consent to assist with respect to the emergency incident may be added to the bottom of the sorted list.

Moreover, according to still another preferred embodiment of the invention, the method can also include sending a notification to the call taker at the PSAP comprising information on the presence of location data received from the co-located telecommunication devices that have provided consent to providing location data, and on the possibility to receive data of interest on the emergency incident from the co-located telecommunication devices that have provided consent to the request.

According to yet another preferred embodiment of the invention, the method can also include the step of sending a SIP INVITE request to the first communication device of the sorted list that according to the location data is the one located closest to the first communication device, and if the first communication device does not answer the request, then a serial ringing procedure can be carried out on the basis of the sorted list for calling the next communication devices of the sorted list serially for enabling live-tracking of the emergency incident.

Preferably, the most appropriate gateway is the antenna which the caller who has made the emergency call using the first communication device used the last time to register into the communication network. However, other gateways can also be utilized.

An emergency communication network comprising an ESRP connected to a PSAP is also provided. The ESRP can be a computer device that has a processor connected to a non-transitory memory and at least one transceiver. The ESRP can also include other hardware (e.g. input device, input/output device, output device, etc.). The ESRP can be adapted for carrying out an embodiment of the method of processing an emergency call. For example, the ESRP can have an application or code stored on the memory so that when the processor runs the application or code, the ESRP carries out an embodiment of the method of processing an emergency call.

Other details, objects, and advantages of the telecommunications apparatus, system, device, non-transitory computer readable medium, and method will become apparent as the following description of certain exemplary embodiments thereof proceeds.

BRIEF DESCRIPTION OF THE DRAWINGS

The invention and embodiments thereof will be described below in further detail in connection with the drawings. It should be appreciated that like reference numbers can identify similar components.

Figure 1:
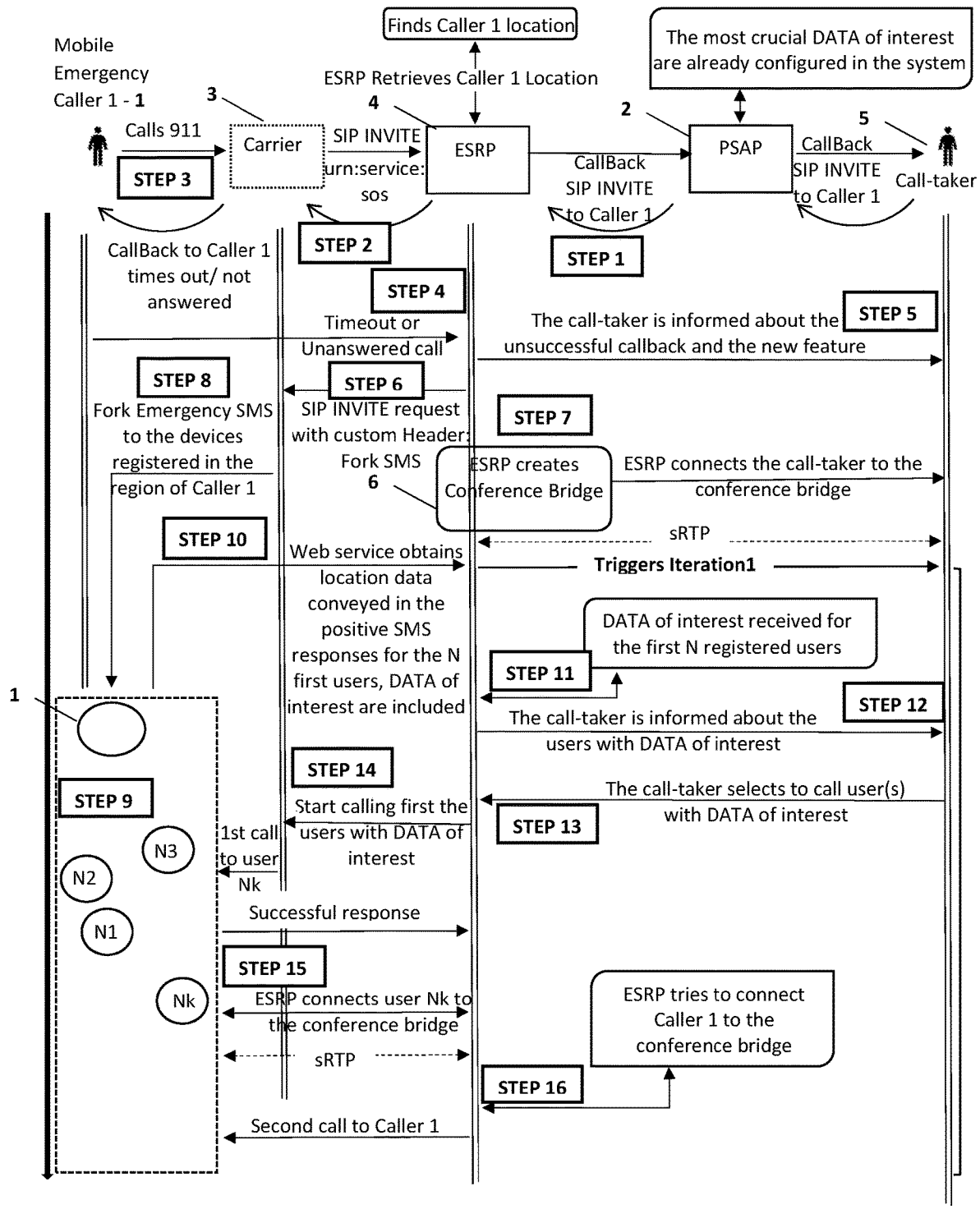
FIG. 1 shows a schematic overview of the method of processing an emergency call according to an embodiment of the invention.

Reference characters used in the drawings include:
1 caller;
2 PSAP,
3 carrier;
4 ESRP;
5 call take; and
6 conference bridge.

DETAILED DESCRIPTION

FIG. 1 shows a schematic overview of the method of processing an emergency call according to an embodiment of the invention. According to the illustrated scenario, a caller 1 makes an emergency call by dialing 911—or any other appropriate telephone number for emergency services—for reporting an emergency incident using a first communication device (not shown). The first communication device can be a cellular phone, a smart phone, or other telecommunication terminal device (e.g. tablet, laptop computer, etc.). The call is transmitted from the corresponding carrier 3 that forwards it via an Emergency Service Routing Proxy (ESRP), ESRP 4, to a Public Safety Answering Point (PSAP), next PSAP 2, where a call taker 5 receives the emergency call. It should be appreciated that the ESRP and the PSAP can each be a computer device or telecommunication device that includes hardware, such as, for example, a processor connected to non-transitory memory and at least one transceiver.

Upon receipt of the emergency call, the call taker 5 initiates an emergency callback request to a caller 1. After initiating the callback request from the PSAP 2, the request is first received by the ESRP 4. Upon receiving the callback request, the latter performs a search operation in order to track the emergency caller's location data (caller 1) and forwards the callback to the carrier 3 (i.e., for example, the antenna A that was used the last time by the caller 1 to register on the network).

Then, the emergency callback request either is received by the communication device of the caller 1 and is not answered by the caller 1, or a timeout event occurs. In both cases, the ESRP 4 detects the problem and tries to resend the request again for a predetermined number of times, for example, 2 times, 5 times or 10 times.

If, however, the callback request is not successful as outlined above (e.g. is not answered by the actual caller at the caller's terminal device), then the ESRP 4 adds a new header in the SIP INVITE request, which indicates that this call will now be forked to the rest of the registered users on antenna A as an emergency SMS. For example, this header could read as follows: CustomEmergencyHeader: Fork SMS, Datax1, Datax2, DataxN, wherein Datax1, DAtax2, DataxN refers to data of interest concerning the emergency incident, as will be explained in further detail below. At the same time a new conference bridge 6 can be created by the ESRP 4. In the next step, the ESRP 4 connects the emergency call taker 5 at the PSAP 2 to bridge 6.

It is noted that the new header may be inserted into the callback request only if a corresponding ESRP software feature is switched on. The carrier 3 that supports this functionality, upon timeout of the callback request on the caller's side, will release this transaction back towards the ESRP 4 adding a response header that the request for forking SMS has been accepted. When the new SIP INVITE request with the new fork-related header as outlined above is received by the carrier 3, the latter will decode the new header and will fork an emergency SMS to all the registered users of antenna A. The users may respond to this emergency SMS by selecting an option regarding different data types (i.e., Datax1, Datax2, DataxN) questions, comprised in the corresponding SMS. Possible questions concerning the emergency incident may be: "Do you agree to help on an incident? If yes, do you agree to provide your location data?" The response to the above mentioned questions may either be YES or NO. Any other types of questions may be generated based on the corresponding data of interest (i.e., Datax1, Datax2, DataxN). It is noted that data of interest may further comprise geolocation data and other data, as for example, Line of Sight (LoS) of the initiator. In any case, the kind of requested information for handing the emergency incident and retrieving data and information is a configuration and agreement between the emergency service and the carrier 3.

The ESRP 4 can wait a predefined time to receive the SMS responses, for example, 60 seconds or more. The responses may include data of interest or not. When the SMS responses are received by the ESRP 4, the latter will create a sorted list with geolocation data of the telecommunication devices that are located nearby or close to the emergency caller 1 using the first communication device for those who agreed to send back their location data to the ESRP 4 (in descending order from closest to further away from caller 1/first communication device). The neighboring telecommunication devices or users of the latter to caller 1 using the first communication device who agreed to assisting in the emergency incident, but who have not shared their location data are added at the bottom of this sorted list.

In the next step, the ESRP 4 sends a notification to the call taker 5 for informing her/him about the presence and the type of emergency data of interest on the SMS responses. The system identifies that the data of interest (i.e., Datax1, Datax2, DataxN) provided in the SMS responses are of the same type to those communicated via the initial SMS requests. After the comparison, the call taker 5 may put the users who provided data of interest on the top of the calling list.

Then, subsequent to the creation of the sorted list, the ESRP 4 can initiate a call by sending an INVITE to the closest neighbor who has answered with YES in the SMS. If he/she doesn't answer within a specific time period, the second party of the list will be called, etc. (serial ringing). The purpose of calling these telecommunication devices is to crowdsource them for live-tracking of the reported emergency incident (with audio-text-video capabilities), which otherwise would have been lost track of. Thus, the users of the telecommunication devices nearby the emergency incident may get involved in assisting the call taker 5 by providing information on the emergency event or by directly helping the caller 1.

If the ESRP 4 doesn't receive any SMS responses within the predetermined time period at all, it can propagate the release due to timeouts towards the call taker 5.

The data of interest mentioned above may comprise geolocation data. However, any type of information that is considered as being relevant or crucial with respect to a NG9-1-1 provider may be provided or requested as data of interest. It is noted that the emergency SMS that will be forked by the carrier 3 may contain an emergency text which will be appropriate for the data of interest that has already been preconfigured in the PSAP 2, for example, according to routing policies. According to the preconfigured data of interest, the ESRP 4 will add in the new header the types of the data, for example, Datax1, Datax2. These indications will trigger the corresponding SMS texts that will be send to the nearby users. For example, if Datax1 equals geolocation, then the emergency text will contain a question as: "Do you want to provide your geolocation data?". If the Datax2 equals LoS, then the emergency text will contain a question as: "Do you have direct view to the emergency incident?".

Figure 2:
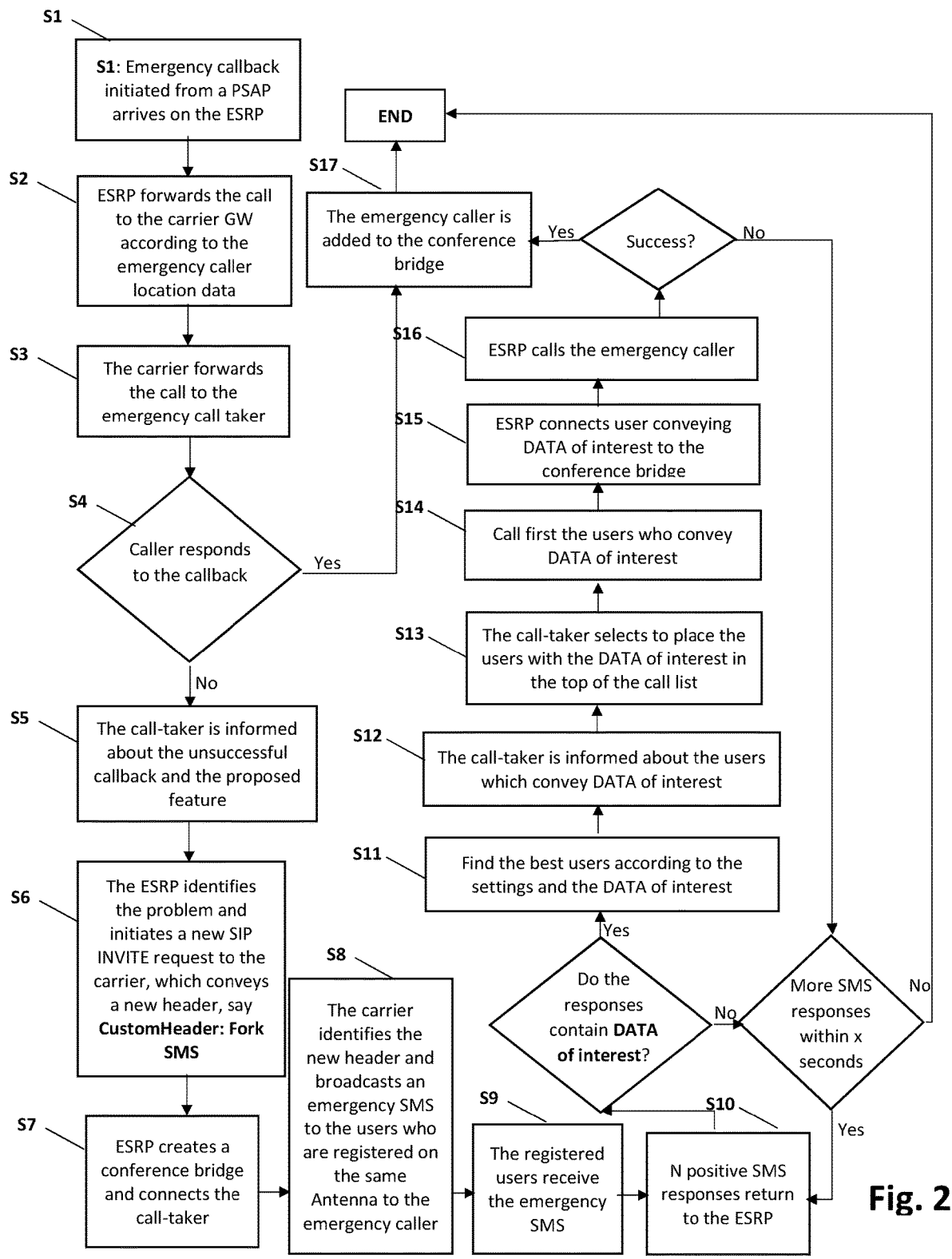
FIG. 2 shows a flow chart for the method of processing an emergency call according to an embodiment of the invention.

FIG. 2 shows a flow chart for the method of processing an emergency call according to an embodiment of the invention. In the first step S1, an emergency callback is initiated from the PSAP. In step S2, the call is received at the ESRP which decides to route the call to the most appropriate gateway GW of the carrier according to the caller's emergency data. In the next step S3, the carrier forwards the call to the emergency call taker at the PSAP who sends a callback request to the emergency caller's telecommunication device. If in step S4, the emergency caller answers the callback request and responds to the call taker's call, the emergency caller and the call taker at the PSAP are able to communicate with each other via the established communication link, thereby, terminating the procedure. However, if the emergency caller does not respond to the callback request, then in step S5, the call taker is informed about the callback request being unsuccessful. In this case, in step S6, the ESRP initiates a new SIP INVITE request to the carrier comprising a new custom header. This new custom header comprises information regarding the type of the message, for example, CUSTOMHeader: Fork SMS, Geolocation, LoS. According to this new header, the carrier is requested to generate a forked emergency SMS. The other pieces of data comprised in this message pertain to the type of data that are of interest to the ESRP. According to this embodiment, this piece of information are the geolocation data and the LoS indication. However, the data may be anything useful for assisting the emergency service.

In the next step S7, the ESRP creates a conference bridge and connects the call taker to the bridge. In step S8, the carrier identifies the new header and forks the SMS to the users that are registered with the same antenna as the emergency caller. The SMS messages carry specific questions for the types of the data supported by the ESRP. In step S9, the users receive the SMS. In the next step S10, N positive SMS responses are returned to the ESRP. The responses are filtered in order to verify, whether they contain the configured data of interest. In case they do not carry data of interest, it is checked whether there are more SMS responses. If this is not the case, then the method terminates.

In step S11, the ESRP applies a mechanism to extract the best users in terms of location (i.e., closest to the emergency caller or LoS communication). In step S12, the call taker is informed about the data of interest. In step S13, the call taker selects to place the users that provide data of interest on the top of the call list. In step S14, a first call is initiated to the user/communication device that is at the very top of the call list. In step S15, if the call has been successful, the ESRP connects the called party to the conference bridge. In step S16, the ESRP calls again the caller for assisting the called party with respect to the conference bridge. In case there this call is successful, the method terminates. Otherwise, it is checked again, whether there are more SMS responses and the method returns to step S10.

Figure 3:
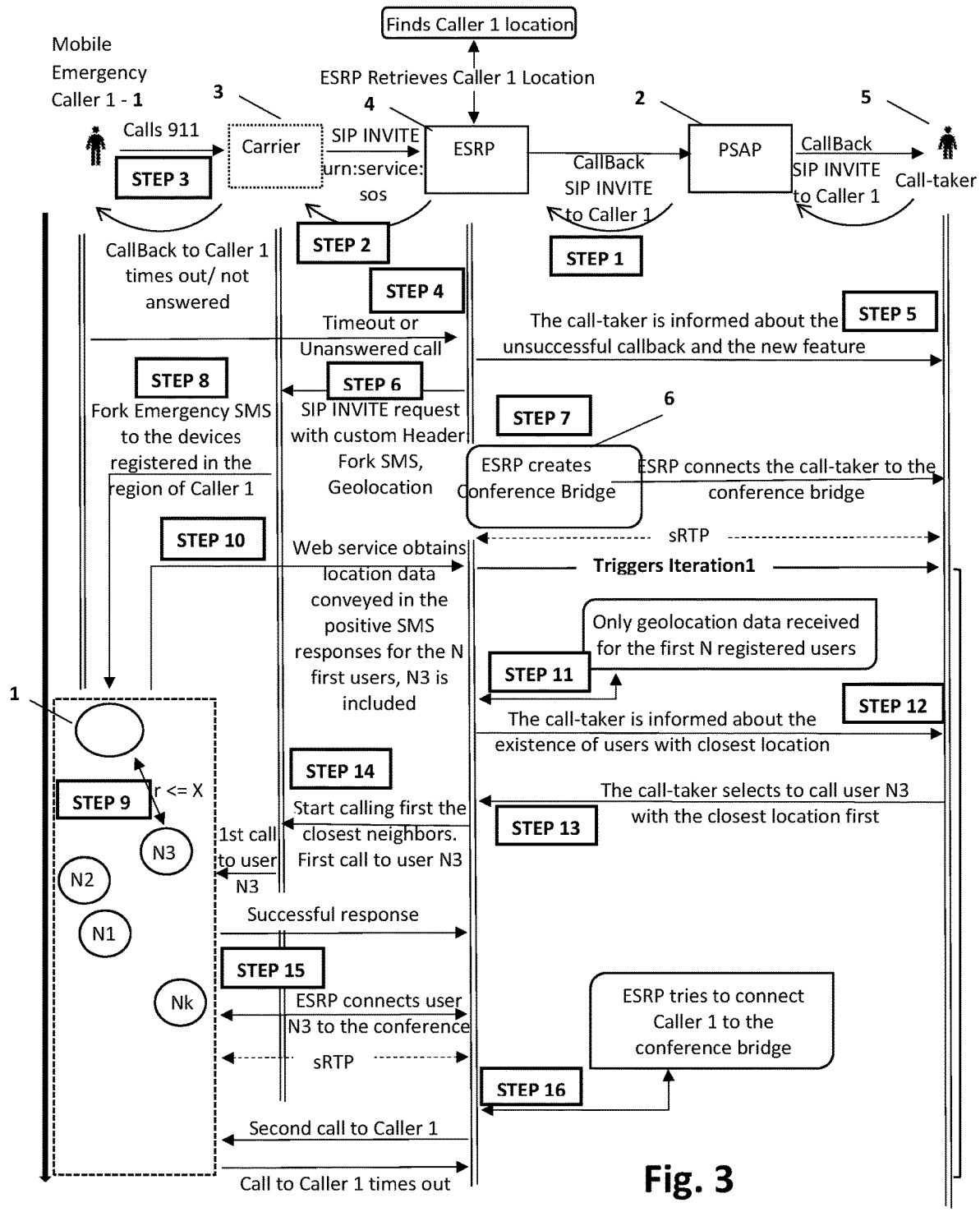
FIG. 3 shows a schematic overview of the method of processing an emergency call according to another embodiment of the invention.

FIG. 3 shows a schematic overview of the method of processing an emergency call according to another embodiment of the invention. In this embodiment, it is assumed that a plurality of users respectively using mobile communication devices registered with the same carrier are located in the same area as the emergency caller 1. These users are indicated by N1, N2, N3, and Nk. Additionally, all of these users respond to the emergency SMS positively and respectively provide their geolocation data.

Thus, in STEP 1, after having received an emergency call from the user 1, an emergency callback request is initiated by the emergency call taker 5 registered with the PSAP 2 that is transmitted to the ESRP 4. In the next STEP 2, the ESRP 4 tracks the emergency caller's location and forwards the callback request to the carrier 3 in an effort to reach the emergency caller via the correct antenna. In STEP 3, no response to this callback request is received. According to this embodiment, it is assumed that this is antenna A and all of the users N1 to Nk are registered with this antenna A (not shown). In STEP 4, the ESRP 4 verifies that either the emergency caller had not responded to the emergency callback request, or a timeout event has been received.

In STEP 5 the ESRP 4 again initiates a SIP INVITE request to the carrier, but this time one more header is added to the request which comprises the following piece of information: "CUSTOMHeader: Fork SMS, geolocation". This request is received by the carrier 3 that extracts the new header, and in STEP 6, it forks an emergency SMS to all the users who are registered with the same antenna A as the emergency caller. In STEP 7, the ESRP 4 creates a conference bridge 6 and connects the call taker 5 to it. In STEP 8, the registered users N1, N2, N3, Nk receive the SMS which contains a message like for example: "Do you agree to help with an emergency incident? If yes, do you agree to provide your location data?". In the next step (i.e., STEP 9), the emergency caller's neighbors respond to the SMS they have received, and the responses are transmitted to the carrier 3. In STEP 10, the carrier 3 forwards the responses to the ESRP 4. In STEP 11, the latter extracts the SMS responses and initiates a procedure in order to track the closest neighbor to the emergency caller 1. In STEP 12, the emergency call taker 5 is informed about users who are located within a radius r≤X with respect to the emergency caller 1. It is noted that X is configurable by the emergency service. In STEP 13, the emergency call taker 5 sorts the users N1, N2, N3, Nk so that the user who is closest to the emergency caller 1 is located at the top of the calling list; in the figure, this is user N3. Using this approach, the ESRP 4 generates a sorted list using the distance and closest neighbor logic by placing the users which have been approved by the call taker 5 as the closest neighbors to the emergency caller 1 on top of the sorted list. In STEP 14, the ESRP 4 initiates a call to each one of the users N1, N2, N3, Nk in the sorted list. In case one of the users fails to respond, then the ESRP 4 proceeds with calling the next one. In this embodiment, it is assumed that user N3 who is the closest one with respect to the emergency caller 1, responds positively to the emergency SMS and also provides his or her data. In this respect, in STEP 15 the ESRP 4 successfully establishes a call with user N3, and adds him or her to the conference bridge 6. In the last STEP 16, the ESRP 4 again tries to accomplish a callback with the emergency caller 1 for also adding him or her to the conference bridge 6. As eventually, after a predetermined time period, no more SMS are received, the method ends. However, during this timeframe, the call taker 5 will talk to user N3 via the conference bridge 6.

Figure 4:
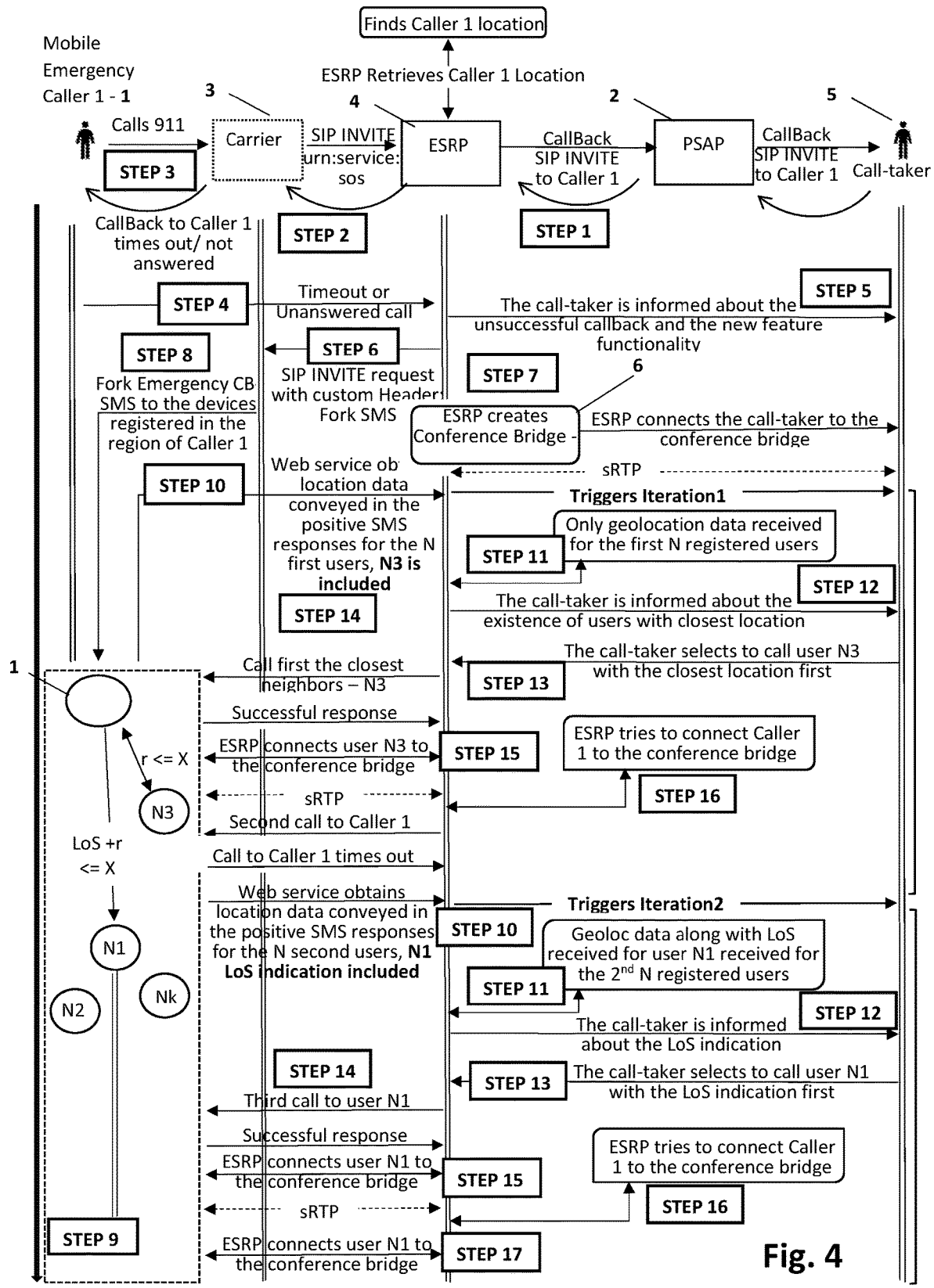
FIG. 4 shows a schematic overview of the method of processing an emergency call according to still another embodiment of the invention.

FIG. 4 shows a schematic overview of the method of processing an emergency call according to still another embodiment of the invention. According to this embodiment, the steps up to STEP 16 basically are the same as in the embodiment described with respect to FIG. 3. The basic difference between the embodiment described with respect to FIG. 3 and this embodiment is both the configured crucial data of interest as well as the number of iterations. That is, in this embodiment, it is assumed that both the geolocation data and the LoS indication have been preconfigured on the system side, and thus, the new header in STEP 6 comprises the following piece of information: "CUSTOMHeader: Fork SMS, LoS, Geolocation".

In STEP 10, the ESRP 4 receives the first N responses. These responses only comprise geolocation data without LoS indication (STEP 11). In STEP 12, the emergency call taker 5 is informed about the geolocation data, and in STEP 13, he or she puts the users that are closest to the emergency caller 1 on top of the calling list. In STEP 14, the ESRP 4 starts calling the users according to the sorted list. In STEP 15, a successful call to the closest user N3 is accomplished, and the ESRP 4 connects user N3 to the conference bridge 6. In STEP 16, the ESRP 4 again tries to connect the emergency caller 1 to the conference bridge 6. However, the callback request is not answered, and thus, is unsuccessful.

After X seconds, N more positive SMS responses are received at the ESRP 4 (STEP 10). In STEP 11, the ESRP 4 verifies that the responses contain both the LoS indication and geolocation data. According to the configured X radius, in STEP 12 the ESRP informs the call-taker about users with the LoS indication which also meet the X radius requirement. In STEP 13 the call-taker selects to put the users with the LoS indication on the top of the calling list. In STEP 14, the ESRP 4 calls user N4 and successfully connects this user to the conference bridge 6 in STEP 15. In STEP 16, the ESRP 4 tries to make a further callback request to the emergency caller 1 and successfully connects him or her to the conference bridge 6 in STEP 17.

It should be appreciated that different embodiments of the method, system, and apparatus can be developed to meet different sets of design criteria. For example, the particular type of network connection, server configuration or client configuration for a device for use in embodiments of the method can be adapted to account for different sets of design criteria. As yet another example, it is contemplated that a particular feature described, either individually or as part of an embodiment, can be combined with other individually described features, or parts of other embodiments. The elements and acts of the various embodiments described herein can therefore be combined to provide further embodiments. Thus, while certain exemplary embodiments of a telecommunication apparatus, telecommunication device, terminal device, a network, a server, a communication system, and methods of making and using the same have been shown and described above, it is to be distinctly understood that the invention is not limited thereto but may be otherwise variously embodied and practiced within the scope of the following claims.

What is claimed is:

1. A computer-implemented method of processing an emergency call reported to a Public Safety Answering Point (PSAP) by a user of a first communication device, the method comprising:

receiving, at an Emergency Service Routing Proxy (ESRP), an emergency callback request from the PSAP that has received an emergency call from a first communication device;

performing, by the ESRP, a search operation to track location data of the first communication device;

forwarding the callback request to a gateway (GW) of a carrier according to the first communication device's location data, and determining that the user of the first communication device does not respond to the callback request within a predetermined time interval and upon said determining, initiating a SIP INVITE request to the carrier, the SIP INVITE request comprising a new header, the new header comprising a request for forking SMS, for initiating, at the carrier, a procedure for retrieving mobile network addresses of communication devices that are co-located to the first communication device for sending a respective emergency SMS to every co-located communication device, and creating a new conference bridge when the request for forking SMS is created and connecting a call taker at the PSAP to the new conference bridge, wherein the new header of the SIP INVITE request includes a CustomEmergencyHeader: Fork SMS, Datax1, Datax2, DataxN format.

2. The method of claim 1, wherein the emergency SMS comprises a request for providing location data of the respective communication device, and/or a request for providing assistance with respect to the emergency incident that was reported by the user of the first communication device, and/or a request for providing data of interest related to the emergency incident to the PSAP.

3. The method of claim 1, comprising:
waiting a predetermined time period for receiving SMS responses to the emergency SMS.

4. The method of claim 3, comprising:
creating a sorted list comprising the location data of the telecommunication devices in the vicinity of the first telecommunication device after the predetermined time period has elapsed and a number of SMS responses comprising consent for providing location data have been received.

5. The method of claim 4, wherein the telecommunication devices that have not provided consent for providing location data but have provided consent to assist with respect to the emergency incident are added to a bottom of the sorted list.

6. The method of claim 5, comprising:
sending a notification to the call taker at the PSAP comprising information on the presence of location data received from the co-located telecommunication devices that have provided consent to providing location data, and on the possibility to receive data of interest on the emergency incident from the co-located telecommunication devices that have provided consent to the request.

7. The method of claim 4, comprising:
sending a SIP INVITE request to a first communication device of the sorted list that, according to the location data, is located closest to the first communication device of the caller, and if the first communication device of the sorted list does not answer the request, then a serial ringing procedure is carried out on the basis of the sorted list, calling next communication devices of the sorted list serially for enabling live-tracking of the emergency incident.

8. The method of claim 1, wherein the GW comprises an antenna which the first communication device that made the emergency call used most recently to register with the communication network.

9. A emergency communication apparatus, comprising:
an Emergency Service Routing Proxy (ESRP)) connectable to a Public Safety Answering Point (PSAP);
wherein the ESRP is adapted for carrying out a method comprising:
performing, by the ESRP, a search operation to track location data of a first communication device in response to receiving an emergency callback request from the PSAP that received an emergency call from the first communication device;
forwarding the callback request to a gateway of a carrier according to the first communication device's location data, and
determining that the user of the first communication device does not respond to the callback request within a predetermined time interval and upon said determining, initiating a SIP INVITE request to a carrier, the SIP INVITE request comprising a new header, the new header comprising a request for forking SMS, for initiating, at the carrier, a procedure for retrieving a mobile network addresses of communication devices that are co-located to the first communication device for sending a respective emergency SMS to every co-located communication device, and creating a new conference bridge when the request for forking SMS is created and connecting a call taker at the PSAP to the new conference bridge,
wherein the new header of the SIP INVITE request includes a CustomEmergencyHeader: Fork SMS, Datax1, Datax2, DataxN format.

10. The emergency communication apparatus of claim 9, wherein the gateway comprises an antenna which the first communication device that made the emergency call used most recently to register with the communication network.

11. A computer-implemented method of processing an emergency call reported to a Public Safety Answering Point (PSAP) by a user of a first communication device, the method comprising:
receiving, at an Emergency Service Routing Proxy (ESRP), an emergency callback request from the PSAP that has received an emergency call from a first communication device;
performing, by the ESRP, a search operation to track location data of the first communication device;
forwarding the callback request to a gateway (GW) of the carrier according to the first communication device's location data;
determining that the user of the first communication device does not respond to the callback request within a predetermined time interval and upon said determining, initiating a SIP INVITE request to the carrier, the SIP INVITE request comprising a new header, the new header comprising a request for forking SMS, for initiating, at the carrier, a procedure for retrieving mobile network addresses of communication devices that are co-located to the first communication device for sending a respective emergency SMS to every co-located communication device; and
waiting a predetermined time period for receiving SMS responses to the emergency SMS.

12. The method of claim 11, wherein the emergency SMS comprises a request for providing location data of the respective communication device, and/or a request for providing assistance with respect to the emergency incident that was reported by the user of the first communication device, and/or a request for providing data of interest related to the emergency incident to the PSAP.

13. The method of claim 11, further comprising:
creating a sorted list comprising the location data of the telecommunication devices in the vicinity of the first telecommunication device after the predetermined time period has elapsed and a number of SMS responses comprising consent for providing location data have been received.

14. The method of claim 13, wherein the telecommunication devices that have not provided consent for providing location data but have provided consent to assist with respect to the emergency incident are added to a bottom of the sorted list.

15. The method of claim 14, comprising:
sending a notification to a call taker at the PSAP comprising information on the presence of location data received from the co-located telecommunication devices that have provided consent to providing location data, and on the possibility to receive data of interest on the emergency incident from the co-located telecommunication devices that have provided consent to the request.

16. The method of claim 13, comprising:
sending a SIP INVITE request to a first communication device of the sorted list that, according to the location data, is located closest to the first communication device of the caller, and if the first communication device of the sorted list does not answer the request, then a serial ringing procedure is carried out on the basis of the sorted list, calling next communication devices of the sorted list serially for enabling live-tracking of the emergency incident.

17. The method of claim 11, wherein the GW comprises an antenna which the first communication device that made the emergency call used most recently to register with the communication network.

18. A emergency communication apparatus, comprising:
an Emergency Service Routing Proxy (ESRP)) connectable to a Public Safety Answering Point (PSAP); wherein the ESRP is adapted for carrying out a method comprising:
performing, by the ESRP, a search operation to track location data of a first communication device in response to receiving an emergency callback request from the PSAP that received an emergency call from the first communication device;
forwarding the callback request to a gateway of the carrier according to the first communication device's location data,
determining that the user of the first communication device does not respond to the callback request within a predetermined time interval and upon said determining, initiating a SIP INVITE request to a carrier, the SIP INVITE request comprising a new header, the new header comprising a request for forking SMS, for initiating, at the carrier, a procedure for retrieving a mobile network addresses of communication devices that are co-located to the first communication device for sending a respective emergency SMS to every co-located communication device; and
waiting a predetermined time period for receiving SMS responses to the emergency SMS.

19. The emergency communication apparatus of claim 18, wherein the gateway comprises an antenna which the first communication device that made the emergency call used most recently to register with the communication network.

* * * * *